United States Patent [19]
Jacobson

[11] 4,382,190
[45] May 3, 1983

[54] WIND MOTOR HAVING HORIZONTALLY COUNTER-ROTATING WIND FORCE COLLECTORS

[76] Inventor: J. Merritt Jacobson, 130 NE. 4th Ave., Boynton Beach, Fla. 33435

[21] Appl. No.: 226,026

[22] Filed: Jan. 19, 1981

[51] Int. Cl.³ ............ F03B 1/02; F03D 3/02; F03D 11/00
[52] U.S. Cl. .................. 290/55; 416/117; 416/132 B
[58] Field of Search ........ 290/44, 55; 416/140 R, 416/142, 143, 197 A, 117, 132 B

[56] References Cited

U.S. PATENT DOCUMENTS

| | | | |
|---|---|---|---|
| 346,797 | 8/1886 | Aylsworth | 416/117 |
| 3,920,354 | 11/1975 | Decker | 416/117 |
| 3,942,025 | 3/1976 | Ri | 290/44 |
| 4,057,270 | 11/1977 | Lebost | 290/44 |

FOREIGN PATENT DOCUMENTS

| | | | |
|---|---|---|---|
| 187872 | 1/1956 | Austria | 416/197 A |
| 2002064 | 2/1979 | United Kingdom | 416/132 B |

Primary Examiner—J. V. Truhe
Assistant Examiner—Shelley Wade
Attorney, Agent, or Firm—Cushman, Darby & Cushman

[57] ABSTRACT

A wind motor having two sets of wind force collectors which rotate in a horizontal plane. One set is vertically displaced from the other and rotates in an opposite direction. One set is connected to the stator and the other to the rotor of an alternator. The wind force collectors have valved wind traps which have high aerodynamic drag in one profile and low aerodynamic drag in the opposite profile.

11 Claims, 8 Drawing Figures

WIND MOTOR HAVING HORIZONTALLY COUNTER-ROTATING WIND FORCE COLLECTORS

BACKGROUND OF THE INVENTION

1. Field of the Invention

This application relates generally to devices for converting a part of the energy of a flowing fluid such as wind into mechanical energy, which is used, in turn, to drive devices such as alternators or generators.

2. Description of the Prior Art

As fossil fuel supplies dwindle, renewable energy sources will be called upon more and more to produce power. One ubiquitous source of renewable energy is wind. Even a gentle breeze has substantial energy, and wind energy increases exponentially with wind velocity. Thus, a wind of eleven miles per hour has one-third more energy than a wind of ten miles per hour.

The class of devices which attempt to capture and utilize wind energy are known generically as wind motors. The best known device of this class, the common windmill, has been used for centuries to derive mechanical energy from wind. The typical windmill has a set of blade-like vanes projecting radially from the end of a horizontal shaft. These vanes are elevated atop a supporting tower. The vanes and their associated horizontal shaft are free to rotate about a vertical axis so that a rudder-like arrangement can keep the vanes facing into the prevailing wind. The vanes are twisted in a manner which causes wind to impart a torque and hence a rotational motion to them. The turning of the vanes turns the horizontal shaft which is typically geared to a vertical shaft which transmits the rotational energy to the ground level.

It is known in the art to mount on the same support a second set of blade-like vanes directly downwind of the first set, with the vanes twisted in an opposite fashion to cause rotation in a direction opposite that of the first set. These counter-rotating props may be connected to a generator or alternator. Such a wind motor is available commercially from Energy Division, Inc., of Miami, Florida.

A more contemporaneous version of the wind motor operates with props or other suitable wind force collectors projecting radially in a horizontal plane from a vertically disposed central shaft or support. Wind force collectors on the wind motor move with the wind for half of a rotation and against the wind during the other half of a rotation. In order for wind to create a net force imbalance, wind force collectors must present more aerodynamic resistance while moving with the wind than while moving against the wind. It is well known to devise such wind force collectors by taking advantage of the fact that wind force collectors rotating in a horizontal plane present one profile while moving with the wind and the opposing profile while moving against the wind. Accordingly, wind force collectors have been provided with wind traps shaped as cups or as hemispheres, whose open sides having high aerodynamic drag, face into the wind when moving with it and whose closed sides, having relatively low aerodynamic drag, face the wind when moving against it. The term wind trap is used to connote any structure affixed to or integral with a wind force collector which performs the function of capturing wind.

Wind traps have also been described which move to a low wind-resistance position during the half cycle in which they move against the wind. A device constructed along these lines is disclosed in U.S. Pat. No. 3,897,170 to Darvishian.

Wind traps as described above have one-half cycle of rotation when they move against the wind, with their low-drag profile facing the wind (their resistive half-cycle), and the other half-cycle when they move with the wind with their high-drag profile facing the wind (their power half-cycle). It is important to note that in the resistive half-cycle, any aerodynamic drag caused by the wind trap reduces the net torque, and hence the net power, produced by the device.

SUMMARY OF THE INVENTION

The present invention is a wind motor having horizontally counter-rotating sets of wind force collectors. Unique valved wind traps, which catch wind while moving with it and allow wind to pass through while moving against it, are provided as part of each wind force collector.

The invention has two sets of wind force collectors, one located coaxially and adjacently below the second. The wind traps on one set of wind force collectors are oriented so that their power half-cycles coincide with the resistive half cycles of wind traps on the other set of wind force collectors. This causes the two sets of wind force collectors to rotate in opposite directions. The rotational energy of one set of wind force collectors is imparted to the rotor of an alternator. The rotational energy of the other set of wind force collectors is imparted to the stator of the same alternator. Thus, the relative angular velocity of the rotor and stator of the alternator is roughly twice the angular velocity of either of the sets of wind force collectors. Because the electrical energy produced by an alternator is a linear function of the relative stator-rotor speed, the electrical energy produced by this arrangement is twice that which would be produced in conventional arrangements where the stator is fixed.

The present invention also has the advantage that no elongated shaft or gearing is required to convey the mechanical energy to where it may be used, as the mechanical energy is converted to electrical energy before it is conveyed to the ground level. Thus, frictional losses are kept at a minimum.

Furthermore, several significant advantages derive from causing the wind force collectors to rotate in a horizontal plane. First, changes in wind direction do not affect the efficiency of the device in extracting power from wind. Second, no intermediate gearing is necessary to transmit useful mechanical energy to ground level. Finally, the wind motor has enhanced vertical stability due to the gyroscopic inertia of the rotating wind force collectors.

BRIEF DESCRIPTION OF THE DRAWING

These and other advantages of the invention will become more readily apparent from the following detailed description of the presently preferred exemplary embodiments, taken together with the accompanying drawing, of which:

FIG. 7 is a front elevation of still another wind trap according to another embodiment of the present invention.

DETAILED DESCRIPTION OF THE PREFERRED EMBODIMENTS

Figure 1:
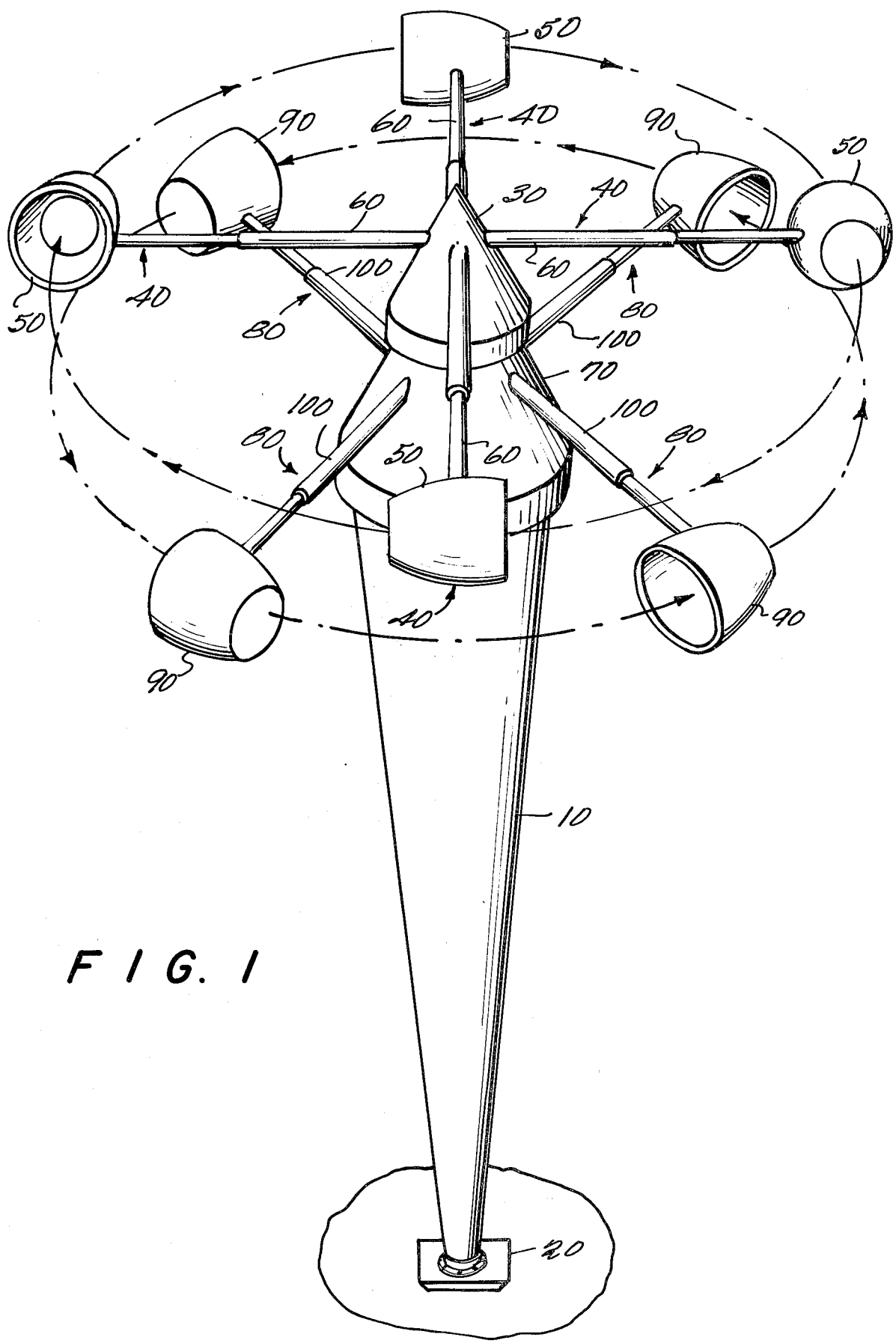
FIG. 1 is a perspective view of a wind motor in accordance with one embodiment of the present invention.

Referring first to FIG. 1, a wind motor according to the present invention has a cylindrical vertical support 10 which is rigidly implanted in base 20. In the presently preferred embodiment, the height of vertical support 10 is approximately 10 to 15 meters. At the top of support 10 is an upper cap piece 30. In the preferred embodiment, upper cap piece 30 is provided with four wind force collectors 40 which are mounted radially at 90 degree intervals from one another. Each wind force collector 40 on upper cap piece 30 includes a wind trap 50 and an arm portion 60 which is connected at one end to upper cap piece 30 and at the other end to wind trap 50. In the preferred embodiment, a wind trap 50 has a tubular or cup-shape. One end of the tube is open and the other end is either closed or has a valve means described below. It will be understood, however, that any shape which presents high aerodynamic drag in one profile and a low aerodynamic drag in its opposing profile may be substituted.

A lower cap piece 70 is arranged coaxially adjacent and below the upper cap piece 30. In the preferred embodiment, lower cap piece 70 also has four radial wind force collectors 80 mounted at 90 degree intervals. Each radial wind force collector 80 includes a wind trap 90 and an arm portion 100 which rigidly connects to the lower cap piece 70 at one end and at the other end is attached to a wind trap 90. The structure of wind trap 90 is similar to that of wind trap 50. Wind traps 50 and 90 are mounted backwards with respect to one another, however, so that the open side of a wind trap on one level faces in an opposing direction to a wind trap on the other level at the same angular displacement about support 10.

Figure 2:
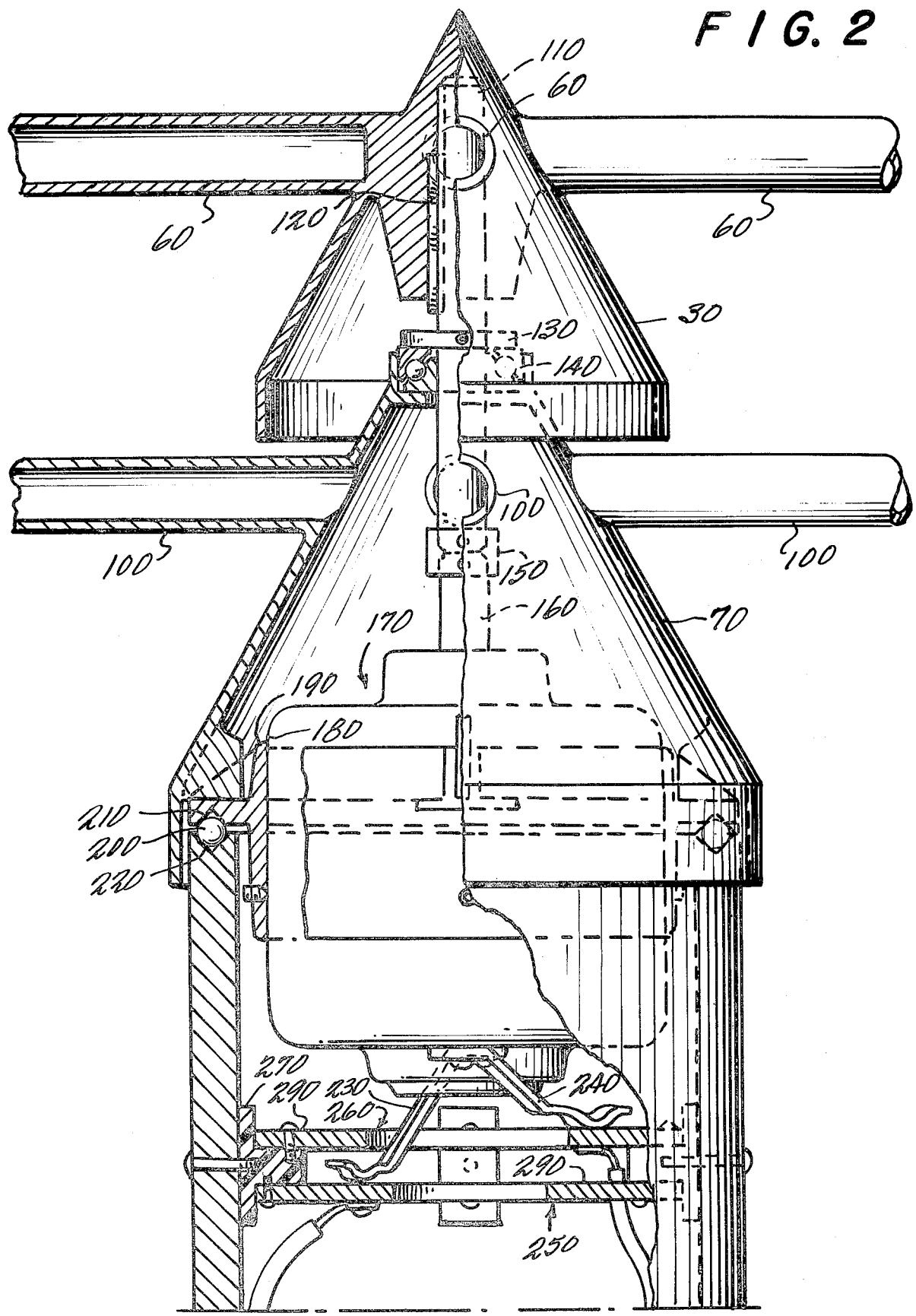
FIG. 2 is a partially cut-way elevation of a wind motor in accordance with the embodiment of FIG. 1.

As shown in FIG. 2, upper cap piece 30 is mounted on shaft 110 by means of key 120. Shaft 110 is also rotatably suspended from the top of lower cap piece 70 by means of collar 130 and thrust bearing 140. Shaft coupling 150 couples shaft 110 to shaft 160, which is, in turn, connected to the rotor of alternator 170. Housing 180 of alternator 170, which is integrally connected to its stator, is rigidly mounted to the interior of lower cap piece 70 by means of bracket 190. Alternator 180 may be any conventional-type alternator, preferably a model having a low speed cut-in; in the preferred embodiment, a 12 volt, 120 amp alternator is used (manufactured by Motorola Automative & Industrial Products, Franklin Park, Ill. 60131).

Lower cap piece 70 is rotatably mounted on support 10 by means of bearings 200 which ride in raceways 210 and 220 in the bottom of bracket 190 and the top of support 10, respectively.

Alternator 170 is equipped with a rotor wiper arm 230 and stator wiper arm 240 connected to the rotor and stator of alternator 170, respectively. Rotor wiper arm 230 rides in electrical contact with lower ring 250, while stator wiper arm 240 rides in electrical contact with upper ring 260. Upper ring 260 has a larger internal diameter than lower ring 250 to permit passage of stator wiper arm 240. Upper ring 260 and lower ring 250 are rigidly mounted inside of support 10 by means of insulated bracket 270. Wires 280 and 290 conduct the electrical energy produced by the device to the ground level, and thence to batteries for storage or to other electrical devices for immediate use.

Figure 3:
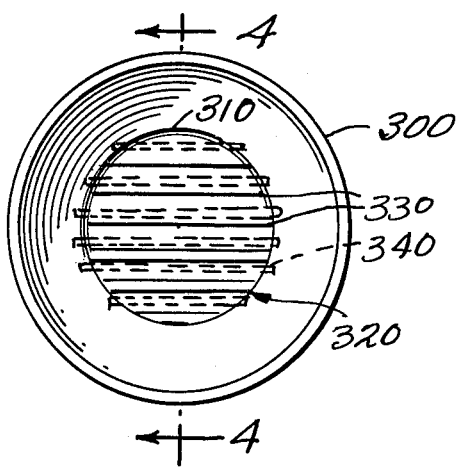
FIG. 3 is a front elevation of a wind trap according to one embodiment of the present invention.
Figure 4:
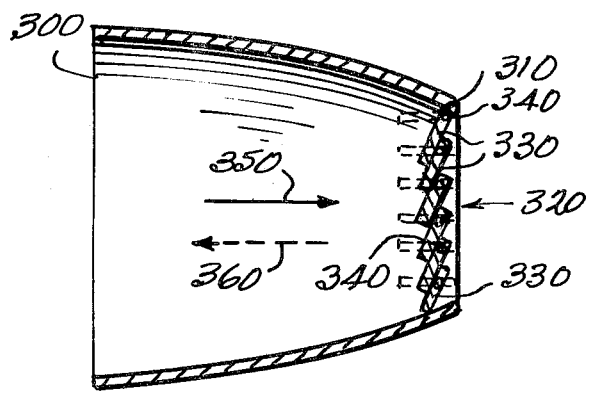
FIG. 4 is a section along the 4—4 line of FIG. 3.

One embodiment of a wind trap according to the present invention is shown in FIGS. 3 and 4. The wind trap has a tubular configuration with an open end 300 and end 310 provided with a wind valve means 320. The wind valve means 320, in the embodiment of FIGS. 3 and 4, is a set of overlapping rectangular flaps 330, each hinged along its upper long edge at hinge 340. When wind blows in the direction of solid arrow 350, flaps 330 close (as illustrated in solid lines in FIG. 4), presenting a high wind resistance. When wind blows in the direction of dashed arrow 360, flaps 330 open (as illustrated in phantom in FIG. 4), presenting a low wind resistance.

Figure 5:
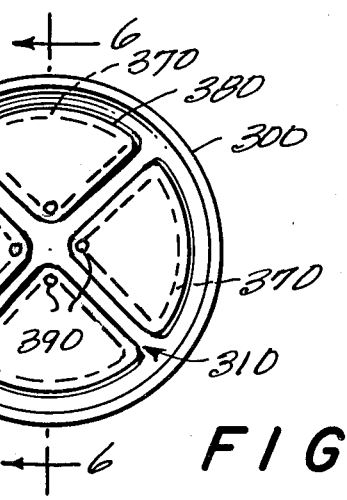
FIG. 5 is a front elevation of another wind trap according to another embodiment of the present invention.
Figure 6:
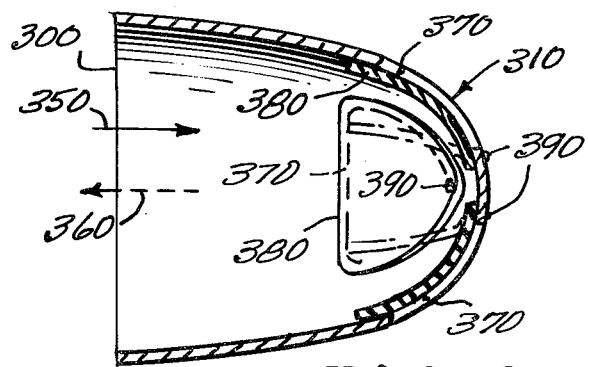
FIG. 6 is a section along the 5—5 line of FIG. 5.

FIGS. 5 and 6 show another embodiment of a wind trap according to the present invention. End 310 is provided with four holes 370. A flexible flap 380 is disposed inside of end 310 and contiguous with each hole 370. Flaps 380 are attached to end 310 at locations 390 and are larger than holes 370 so as to overlap and cover these holes. When wind blows in the direction of arrow 350, it tends to force flaps 380 against holes 370 so that flaps 380 seal and prevent the passage of air through holes 370. When wind blows in the direction of arrow 360, flaps 380 flex away from holes 370 so as to unblock and permit the passage of air through holes 370.

Figure 8:
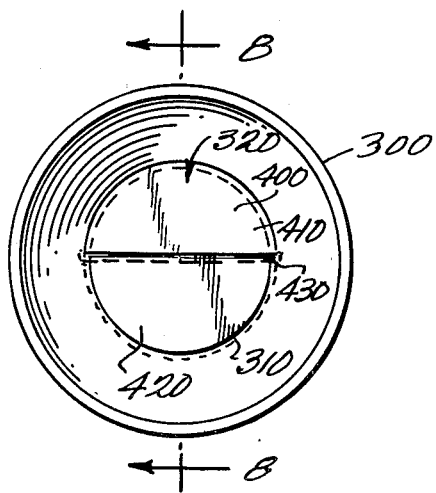
FIG. 8 is a section along the 7—7 line of FIG. 7.
Figure 8:
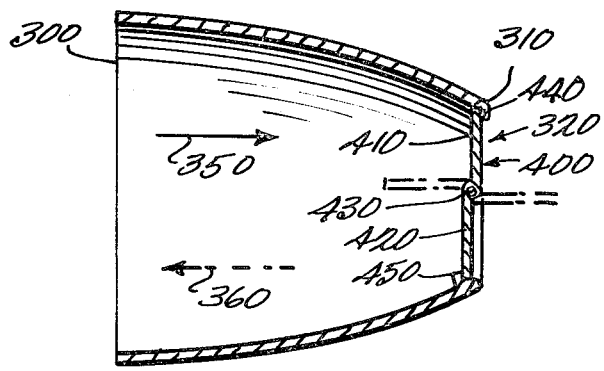

FIGS. 7 and 8 shown another embodiment of a wind trap according to the present invention. The wind trap's structure is similar to that in the embodiments of FIGS. 3 and 4, except that the valve means 320 comprises a single flap 400 having two connected semi-circular portions 410 and 420 offset at their common diameter and hinged at the diameter by hinge 430. Stops 440 and 450 are disposed at end 310 on opposite sides of flap 400 when flap 400 is closed. Stops 440 and 450 prevent flap 400 from rotating so that a lower portion 420 of flap 400 follows an upper portion 410 of flap 400 with respect to the direction of rotation, to prevent flap 400 from rotating counterclockwise beyond the vertical (closed) position shown in FIG. 8. Lower portion 420 must have a slightly larger surface area than upper portion 410 so that when the wind blows in the direction of arrow 350 in FIG. 8, it creates a net counterclockwise torque on flap 400, which would rotate past the vertical but for stops 440 and 450. When the wind blows in the direction of arrow 360, flap 400 assumes the horizontal (open) position shown in phantom in FIG. 8, thus reducing net wind resistance.

Although only one embodiment of this invention has been described in detail above, those skilled in the art will readily appreciate that many modifications are possible without departing from the novel teachings and advantages of this invention. For example, arm portions 100 and 60 may be made in two parts, one telescoping into the other, so that the length of the arm means may be varied with wind speed. Accordingly, all such modifications are intended to be included within the scope of this invention as defined by the following claims.

What is claimed is:

1. An apparatus for deriving rotational kinetic energy from wind ambient to said apparatus comprising:

a support adapted to be vertically disposed;

first wind force extraction means pivotably connected to said support to rotate in a first direction substantially perpendicular to said support when exposed to wind, said first extraction means including at least one wind trapping means having a cup-shaped body with an open end and valving means disposed at the other end of said body for permitting the passage of wind in one direction but not in the other; and at least one means for interconnecting said at least one wind trapping means and said support;

second wind force extraction means pivotably connected to said support to rotate in a second direction opposed to said first direction in a plane substantially perpendicular to said support when exposed to wind, said second extraction means including at least one wind trapping means having a cup-shaped body with an open end and valving means disposed at the other end of said body for permitting the passage of wind of one direction but not in the other, and at least one means for interconnecting said at least one wind trapping means and said support, said first and second extraction means both being disposed in an area directly responsive to said ambient wind without direction alteration of said wind except by said first and second extraction means; and means for generating electrical energy having a shaft and a housing, said shaft being coupled to said first extracting means; and wherein said first and second valve means includes means defining a plurality of open segments radially disposed about the central portion of said other end, a plurality of flexible flap means larger than said open segments and covering each of said open segments on the interior of said body, and means for fixedly securing each of said flap means to said central portion and for permitting each of said flap means to convergingly flex toward the interior of said body.

2. An apparatus as in claim 1 wherein said segment defining means defines four substantially equal segments quadrantly arranged at said other end.

3. An apparatus as in claim 1 wherein said segment defining means includes for each of said open segments, first and second leg members radially extending from said central portion, and an arcuate edge member joining each of said first and second members a predetermined radial distance from said central portion, said arcuate edge member together with said first and second leg members thereby defining one of said open segments.

4. An apparatus for deriving rotational kinetic energy from wind ambient to said apparatus comprising:

a support adapted to be vertically disposed;

first wind force extraction means pivotably connected to said support to rotate in a first direction in a plane substantially perpendicular to said support when exposed to wind, said first extraction means including at least one first means for trapping wind having a cup-shaped body with an open end and first valve means disposed at the other end of said body for permitting the passage of wind in one direction but not in the other and at least one means for interconnecting said at least one wind trapping means and said support; and second wind force extraction means pivotably connected to said support to rotate in a second direction opposed to said first direction in a plane substantially perpendicular to said support when exposed to wind, said second extraction means including at least one second means for trapping wind having a cup-shaped body with an open end and second valve means disposed at the other end of said body for permitting the passage of wind in one direction but not in the other, and at least one means for interconnecting said at least one wind trapping means and said support, said first and second extraction means both being disposed in an area directly responsive to said ambient wind without direction alteration of said wind except by said first and second extraction means; and wherein said first and second valve means each includes means defining a plurality of open segments radially disposed about the central portion of said other end, a plurality of flexible flap means larger than said open segments and covering each of said open segments on the interior of said body, and means for fixedly securing each of said flap means to said central portion and for permitting each of said flap means to convergingly flex toward the interior of said body.

5. An apparatus as in claim 4 wherein said segment defining means includes for each of said open segments, first and second leg members radially extending from said central portion, and an arcuate edge joining each said first and second members a predetermined radial distance from said central portion, said arcuate edge together with said first and second leg members thereby defining one of said open segments.

6. An apparatus as in claim 1 or 4 wherein said segment defining means defines four substantially equal segments quadrantly arranged at said other end.

7. An apparatus for deriving rotating kinetic energy from wind ambient to said apparatus comprising:

wind force extraction means including at least one wind trapping means having a cup-shaped body with an open end and valving means disposed at the other end of said body for permitting the passage of wind in one direction but not in the other, said valving means including means defining a plurality of open segments radially disposed about the central portion of said other end, a plurality of flexible flap means larger than said open segments and covering each of said open segments on the interior of said body, and means for fixedly securing each of said flap means to said central portion and for permitting each of said flap means to convergingly flex toward the interior of said body; and means supporting said wind force extraction means a predetermined distance above ground for pivotable movement in a predetermined direction when exposed to wind.

8. An apparatus as in claim 7 further comprising means for generating electrical energy having a shaft and a housing, said shaft being operatively coupled to said wind force extraction means.

9. An apparatus as in claim 7 or 8 wherein said segment defining means includes for each of said open segments, first and second leg members radially extending from said central portion, and an arcuate edge member joining each of said first and second members a predetermined radial distance from said central portion, said arcuate edge member together with said first and second leg members thereby defining one of said open segments.

10. An apparatus as in claim 9 wherein said segment defining means defines four substantially equal segments quadrantly arranged at said other end.

11. An apparatus as in claim 7 or 8 wherein said segment defining means defines four substantially equal segments quadrantly arranged at said other end.

* * * * *